United States Patent
Yang et al.

(10) Patent No.: US 10,948,049 B2
(45) Date of Patent: Mar. 16, 2021

(54) TRANSMISSION MECHANISM AND ONE-WAY COMPONENT THEREOF

(71) Applicant: INDUSTRIAL TECHNOLOGY RESEARCH INSTITUTE, Hsinchu (TW)

(72) Inventors: Cheng-Ping Yang, Hsinchu (TW); Meng-Ru Wu, Hsinchu (TW); Ming-Hsien Yang, Hsinchu (TW); Peng-Yu Chen, Hsinchu (TW); Jui-Tang Tseng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 813 days.

(21) Appl. No.: 15/660,499

(22) Filed: Jul. 26, 2017

(65) Prior Publication Data
US 2018/0335110 A1    Nov. 22, 2018

(30) Foreign Application Priority Data
May 19, 2017   (TW) .................................. 106116664

(51) Int. Cl.
    *F16H 3/10*     (2006.01)
    *F16D 41/064*   (2006.01)
    *F16H 3/089*    (2006.01)
    *F16H 37/08*    (2006.01)

(52) U.S. Cl.
    CPC ............ *F16H 3/10* (2013.01); *F16D 41/064* (2013.01); *F16H 3/089* (2013.01); *F16H 37/0813* (2013.01); *F16H 2200/0034* (2013.01)

(58) Field of Classification Search
    CPC ........ F16H 3/10; F16H 3/089; F16H 37/0813; F16H 2200/0034; F16D 41/064
    USPC ........................................................ 74/325
    See application file for complete search history.

(56) References Cited

U.S. PATENT DOCUMENTS

| 4,771,656 | A  | 9/1988  | Itoh et al. |
| 8,028,597 | B2 | 10/2011 | Cannon |
| 8,596,156 | B2 * | 12/2013 | Clark .................... B60W 10/02 74/325 |
| 8,845,489 | B2 * | 9/2014 | Vialle ...................... F02C 7/36 477/55 |
| 8,888,647 | B2 | 11/2014 | Ekonen et al. |
| 8,961,353 | B2 | 2/2015  | Valente et al. |

(Continued)

FOREIGN PATENT DOCUMENTS

| CN | 2794545 Y | 7/2006 |
| CN | 200971047 Y | 11/2007 |

(Continued)

OTHER PUBLICATIONS

Taiwan Patent Office, Office Action, Patent Application Serial No. TW106116664, dated Feb. 13, 2019.

(Continued)

*Primary Examiner* — Ha Dinh Ho
(74) *Attorney, Agent, or Firm* — Rabin & Berdo, P.C.

(57) ABSTRACT

A transmission mechanism includes first and second transmission, first and second shafts, a clutch, and a one-way bearing. In the first gear, power is output through the first driving transmission and the one-way bearing; and in the second gear, the power is output through the clutch, the second driving transmission and the one-way bearing.

17 Claims, 4 Drawing Sheets

(56) References Cited

U.S. PATENT DOCUMENTS

| | | | |
|---|---|---|---|
| 8,986,148 | B2 | 3/2015 | Downs et al. |
| 9,102,226 | B2* | 8/2015 | Makino ................. B60L 15/20 |
| 9,114,799 | B2 | 8/2015 | Tsukamoto et al. |
| 9,205,739 | B2 | 12/2015 | Ekonen et al. |
| 9,404,414 | B2 | 8/2016 | Versteyhe et al. |
| 9,416,858 | B2 | 8/2016 | Versteyhe et al. |
| 9,556,941 | B2 | 1/2017 | Ziech et al. |
| 9,644,709 | B2* | 5/2017 | Venturi ................. B60K 6/387 |
| 10,167,053 | B2* | 1/2019 | Yamamoto ............. B62M 6/55 |
| 10,232,700 | B2* | 3/2019 | Eo ............................ B60K 6/48 |
| 10,246,282 | B2* | 4/2019 | Miki ........................ B65H 7/00 |
| 10,350,986 | B2* | 7/2019 | Park ........................ F16H 3/089 |
| 10,533,640 | B2* | 1/2020 | Littlefield .............. F16H 3/091 |
| 2007/0049451 | A1 | 3/2007 | Mizon et al. |
| 2011/0079097 | A1 | 4/2011 | Cavallino |
| 2012/0053012 | A1 | 3/2012 | Yamada et al. |
| 2013/0192394 | A1 | 8/2013 | Ekonen et al. |

FOREIGN PATENT DOCUMENTS

| | | |
|---|---|---|
| CN | 101771310 A | 7/2010 |
| CN | 201784785 U | 4/2011 |
| CN | 102042373 A | 5/2011 |
| CN | 102303684 A | 1/2012 |
| CN | 202782677 U | 3/2013 |
| CN | 202944204 U | 5/2013 |
| CN | 204755782 U | 11/2015 |
| CN | 204878637 U | 12/2015 |
| CN | 105276027 A | 1/2016 |
| CN | 205715483 U | 11/2016 |
| CN | 205780631 U | 12/2016 |
| CN | 205780633 U | 12/2016 |
| CN | 104565228 B | 1/2017 |
| DE | 102013219229 A1 | 3/2015 |
| JP | S57190149 A | 11/1982 |
| TW | 468735 U | 12/2001 |
| TW | M431245 U | 6/2012 |
| TW | 201341220 A | 10/2013 |
| TW | I475165 B | 3/2015 |
| TW | I482921 B | 5/2015 |
| TW | 201700316 A | 1/2017 |

OTHER PUBLICATIONS

Taiwan Patent Office, Office Action, Patent Application Serial No. TW106116664, dated Apr. 9, 2018, Taiwan.

Taiwan Patent Office, Office Action, Patent Application Serial No. TW106116664, dated Nov. 29, 2017, Taiwan.

Taiwan Patent Office, Office Action, Patent Application Serial No. TW106116664, dated Oct. 11, 2018, Taiwan.

Shin et al., Design of 2-speed transmission for electric commercial vehicle, International Journal of Automotive Technology, Feb. 2014, vol. 15, Issue 1, pp. 145-150.

Gao et al., Investigation of Proper Motor Drive Characteristics for Military Vehicle Propulsion, SAE Technical Paper, 2003.

Sorniotti et al., Analysis and simulation of the gearshift methodology for a novel two-speed transmission system for electric powertrains with a central motor, Proceedings of the Institution of Mechanical Engineers, Part D: Journal of Automobile Engineering, 2012, 226(7), pp. 915-929.

Hong et al., Shift control of a dry-type two-speed dual-clutch transmission for an electric vehicle, Proceedings of the Institution of Mechanical Engineers, Part D: Journal of Automobile Engineering, 2016, 230(3), pp. 308-321.

Sorniotti et al., A Novel Seamless 2-Speed Transmission System for Electric Vehicles: Principles and Simulation Results, SAE Int, 2011, Colume 4, Issue 2, pp. 2671-2685.

Hu et al., A torque compensation strategy in two-speed automated mechanical transmission shift process for pure electric vehicles, Advances in Mechanical Engineering, 2015, 7(11), pp. 1-11.

Fu et al., A novel control scheme of propulsion motor for integrated powertrain of electric bus, Vehicle Power and Propulsion Conference, 2009. VPPC '09. IEEE, 2009, pp. 1496-1501.

* cited by examiner

TRANSMISSION MECHANISM AND ONE-WAY COMPONENT THEREOF

BACKGROUND

1. Technical Field

The present disclosure relates to transmission mechanisms, and, more particularly, to a transmission mechanism applicable to moving devices.

2. Description of Related Art

At present, the transmission mechanism used in general vehicles is not only complicated but also costly. In contrast, for golf carts, as the vehicle speed does not need to be too fast and there is no need for a complicated gearshift mechanism, it is not only costly but also not practical to use the transmission mechanism for general vehicles in golf carts.

Therefore, there is a need for a solution to address the aforementioned issues in the prior art.

SUMMARY OF THE DISCLOSURE

In view of the aforementioned shortcomings of the prior art, the present disclosure provides a transmission mechanism, which may include: a first transmission; a second transmission; a first shaft for driving the first transmission and the second transmission; a second shaft for driving the first transmission and the second transmission; a clutch furnished corresponding to the location of the second transmission for controlling the first shaft; and a one-way component furnished corresponding to the location of the second transmission for allowing the second transmission to actuate in cooperation with the one-way component.

The present disclosure further provides a one-way component, which may include: a first one-way bearing; a second one-way bearing coaxially connected to the first one-way bearing and moving in a different direction from the first one-way bearing; and a clutch connected to the second one-way bearing.

DETAILED DESCRIPTION OF THE EMBODIMENTS

Figure 1:
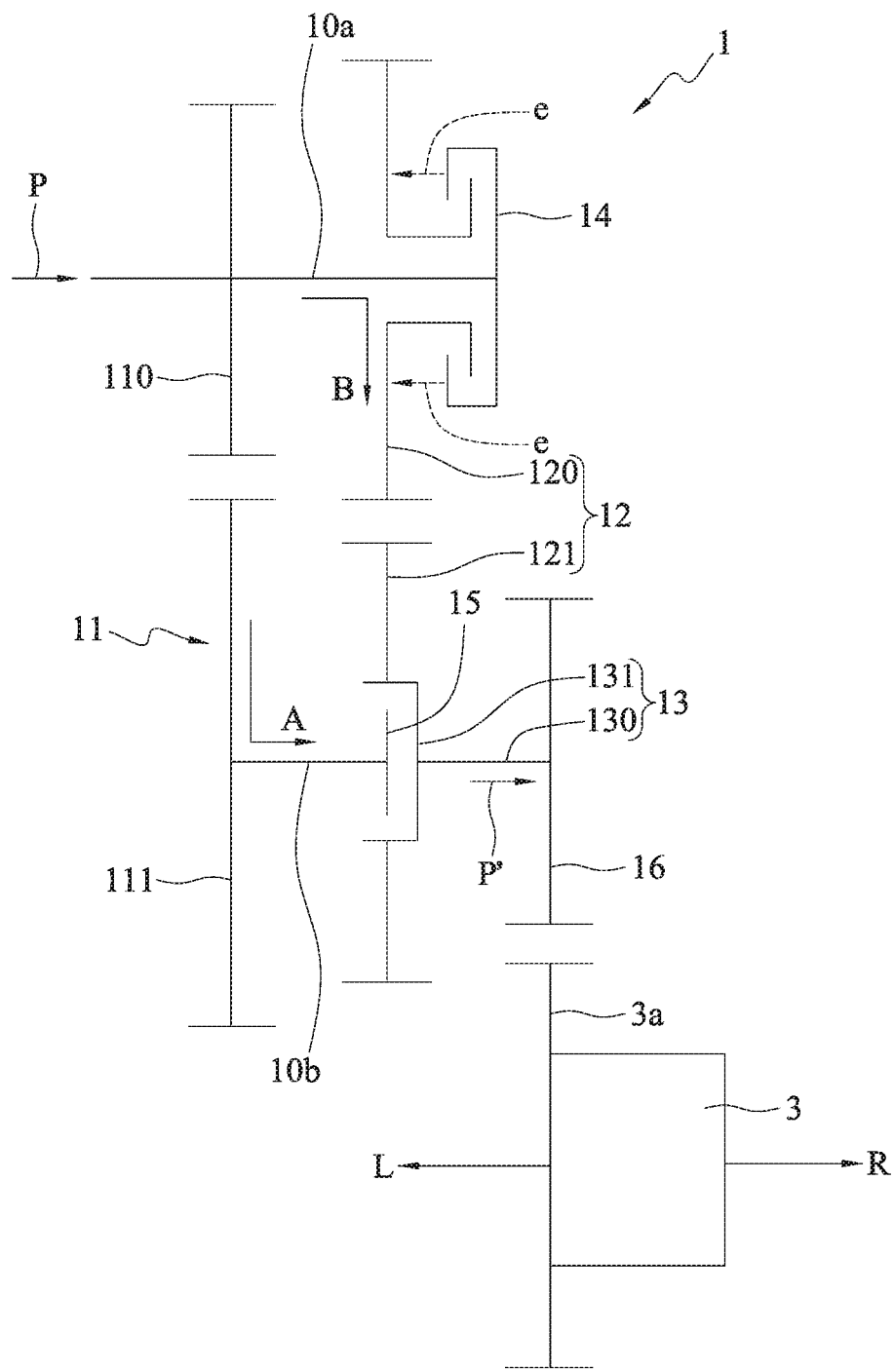
FIG. 1 is a schematic mechanical diagram of a transmission mechanism in accordance with a first embodiment of the present disclosure.

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "above", "below", "first", "second", "one", "a", "an", and the like, are for illustrative purposes only, and are not meant to limit the range implementable by the present disclosure. Any changes or adjustments made to their relative relationships, without modifying the substantial technical contents, are also to be construed as within the range implementable by the present disclosure.

FIG. 1 is a schematic mechanical diagram of a transmission mechanism 1 in accordance with a first embodiment of the present disclosure. The transmission mechanism 1 includes a first transmission 11, a second transmission 12, a first shaft 10a, a second shaft 10b, a clutch 14, and a one-way component 15.

The first transmission 11 includes two gears 110 and 111 engaged with each other, in which one gear (an upper gear) 110 is driven by the first shaft 10a, while the other gear (a lower gear) 111 is driven by the second shaft 10b. It can be appreciated that the first transmission 11 can be another type of transmission structure, for example, chains, belts or other suitable mechanical elements, and is not limited to gears.

The second transmission 12 includes two gears 120 and 121 engaged with each other, in which one gear (an upper gear) 120 is driven by the first shaft 10a, while the other gear (a lower gear) 121 is driven by the second shaft 10b. It can be appreciated that the second transmission 12 can be another type of transmission structure, for example, chains, belts or other suitable mechanical elements, and is not limited to gears.

The first shaft 10a can be a rod that penetrates through the upper gear 110 of the first transmission 11 and the upper gear 120 of the second transmission 12, so as to drive the upper gear 110 of the first transmission 11 and the upper gear 120 of the second transmission 12.

The second shaft 10b can be a rod that penetrates through the lower gear 111 of the first transmission 11 and the lower gear 121 of the second transmission 12, so as to drive the lower gear 111 of the first transmission 11 and the lower gear 121 of the second transmission 12.

The clutch 14 is furnished corresponding to the location of the upper gear 120 of the second transmission 12 and is connected to the first shaft 10a to control the first shaft 10a.

In an embodiment, the clutch 14 is a centrifugal clutch, and the first shaft 10a drives the first transmission 11 and the clutch 14.

The one-way component 15 is furnished corresponding to the location of the lower gear 121 of the second transmission 12, such that the second transmission 12 actuates in cooperation with the one-way component 15.

In an embodiment, the one-way component 15 is a one-way bearing that drives an output component 13. In another embodiment, the output component 13 is of a rod output type (or a gear output type), which includes a case 131 furnished outside the one-way component 15 and a shaft rod 130 connected to the case 131. The output component 13 is connected to an external gear 16 via the shaft rod 130. The gear 16 is engaged with a gear 3a of a differential 3 in order to drive the differential 3. In an embodiment, the shaft rod 130 of the output component 13 can be optionally integrated with the second shaft 10b.

Therefore, when the transmission mechanism 1 is in a first gear (e.g., a low-speed gear), the transmission of power P is as shown by the direction of an arrow A. The first shaft 10a drives the first transmission 11, then the second shaft 10b operates in cooperation with the one-way component 15, and power P' is output via the shaft rod 130 of the output component 13. At this time, as the clutch 14 is not engaged with the second transmission 12, so the second transmission 12 does not operate.

Furthermore, when using the transmission mechanism 1 in a second gear (e.g., a high-speed gear), the clutch 14 will engage the second transmission 12 (for example, when the clutch 14 moves towards and abuts the upper gear 120 of the second transmission 12 along direction e), and the transmission of power P is as shown by the direction of an arrow B. That is, the first shaft 10a drives the clutch 14, then the second transmission 12 operates in cooperation with the one-way component 15, and power P' is output via the shaft rod 130 driven by the case 131 of the output component 13. At this time, although the first shaft 10a will drive the first transmission 11 and the second shaft 10b, the rotational speed of the second transmission 12 is higher than the rotational speed of the second shaft 10b (or the first transmission 11), resulting in idling of the second shaft 10b (or the first transmission 11), and the second transmission 12 will drive the case 131 and output power P'.

In an embodiment, the transmission mechanism 1 can be applicable to moving devices and types of cars that has no reversing function, such as, for example, golf carts, scooters, electric bikes, wheelchairs or the like, in order to drive wheels at different locations R and L (front/rear wheels or right/left wheels) of the differential 3, for example.

Figure 2:
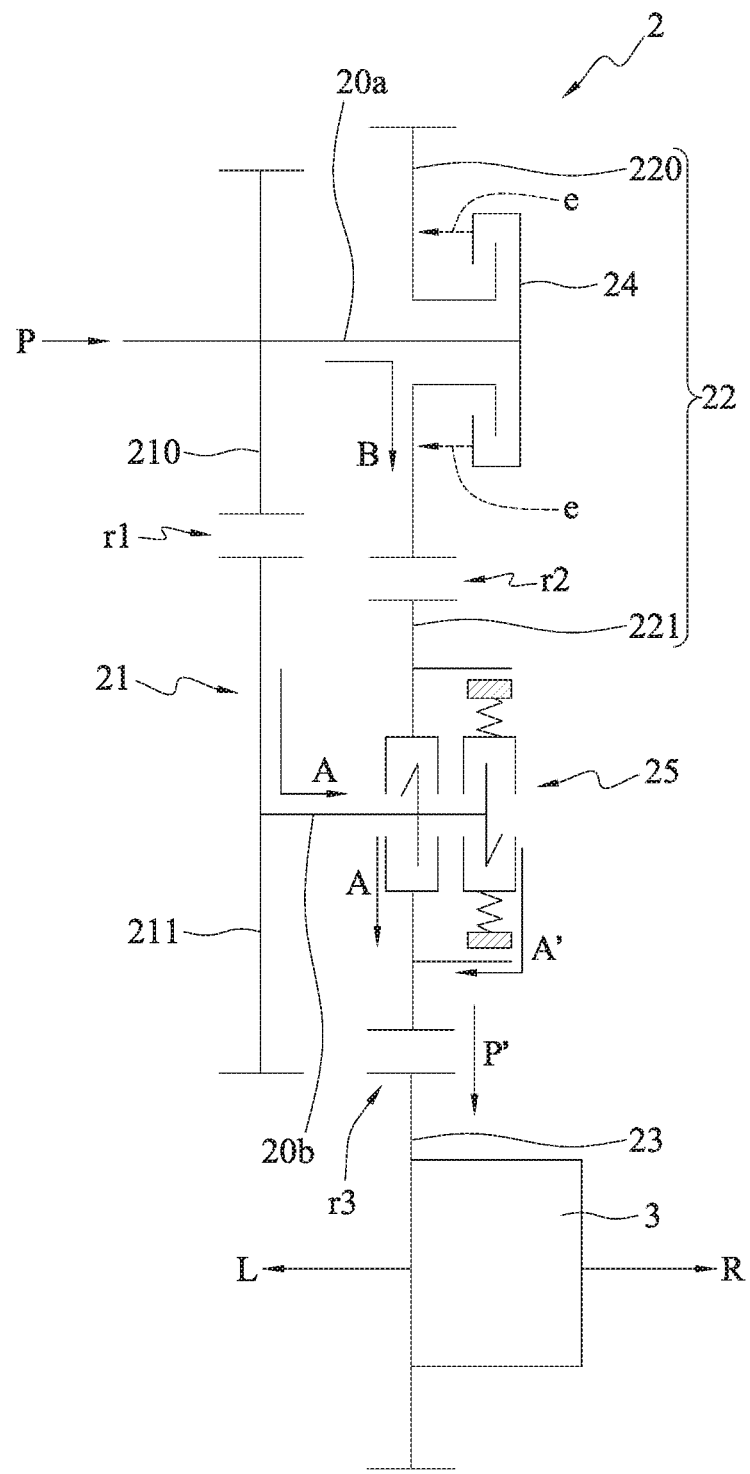
FIG. 2 is a schematic mechanical diagram of a transmission mechanism in accordance with a second embodiment of the present disclosure.

FIG. 2 is a schematic mechanical diagram of a transmission mechanism 2 in accordance with a second embodiment of the present disclosure. The second embodiment differs from the first embodiment in the structure and output method of the one-way component.

As shown in FIG. 2, the transmission mechanism 2 includes a first transmission 21, a second transmission 22, a first shaft 20a, a second shaft 20b, a clutch 24, and a one-way component 25.

The first transmission 21 includes two gears 210 and 211, in which one gear (an upper gear) 210 is driven by the first shaft 20a, while the other gear (a lower gear) 211 is driven by the second shaft 20b. It can be appreciated that the first transmission 21 can also assume another form of transmission structure, for example, chains, belts or other suitable mechanical elements, and is not limited to gears.

The second transmission 22 includes two gears 220 and 221, in which one gear (an upper gear) 220 is driven by the first shaft 20a, while the other gear (a lower gear) 221 is driven by the second shaft 20b. It can be appreciated that the second transmission 22 can also assume another form of transmission structure, for example, chains, belts or other suitable mechanical elements, and is not limited to gears.

The first shaft 20a can be a rod that drives the upper gear 210 of the first transmission 21 and the upper gear 220 of the second transmission 22.

The second shaft 20b can be a rod that drives the lower gear 211 of the first transmission 21 and the lower gear 221 of the second transmission 22.

The clutch 24 is furnished corresponding to the location of the upper gear 220 of the second transmission 22 and actuates the first shaft 20a.

In an embodiment, the first shaft 20a drives the first transmission 21 and the clutch 24.

The one-way component 15 is furnished corresponding to the location of the lower gear 221 of the second transmission 22, such that the second transmission 22 is actuated in cooperation with the one-way component 15.

In an embodiment, the one-way component 15 is a one-way bearing that drives an output component 23. In another embodiment, the output component 23 is of a gear output type, which includes a gear for driving a differential 3. In yet another embodiment, the gear may be furnished on the differential 3.

Figure 3:
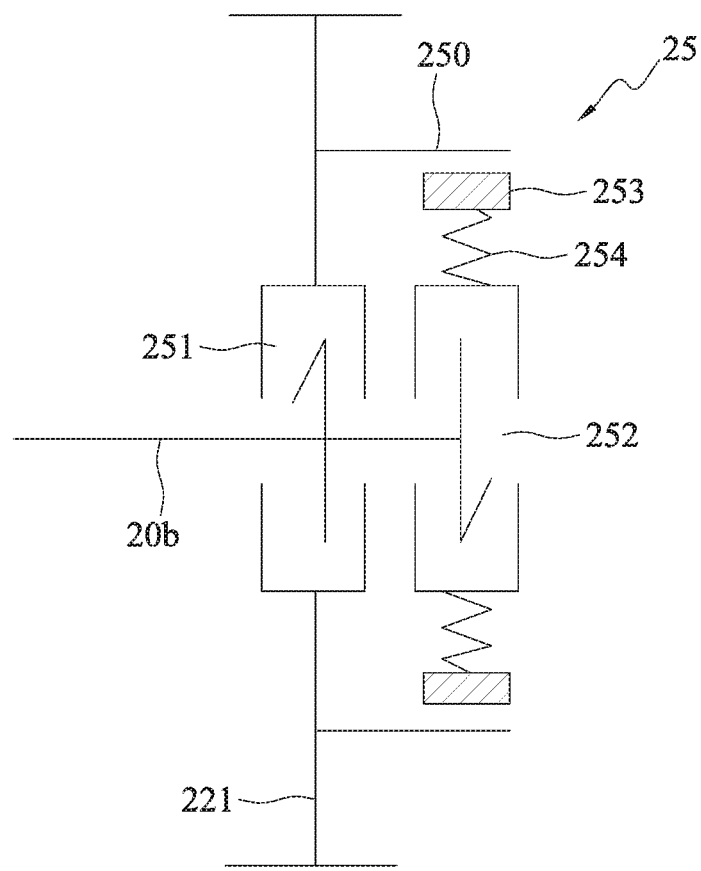
FIG. 3 is a schematic mechanical diagram of a one-way component in accordance with the present disclosure.
Figure 4:
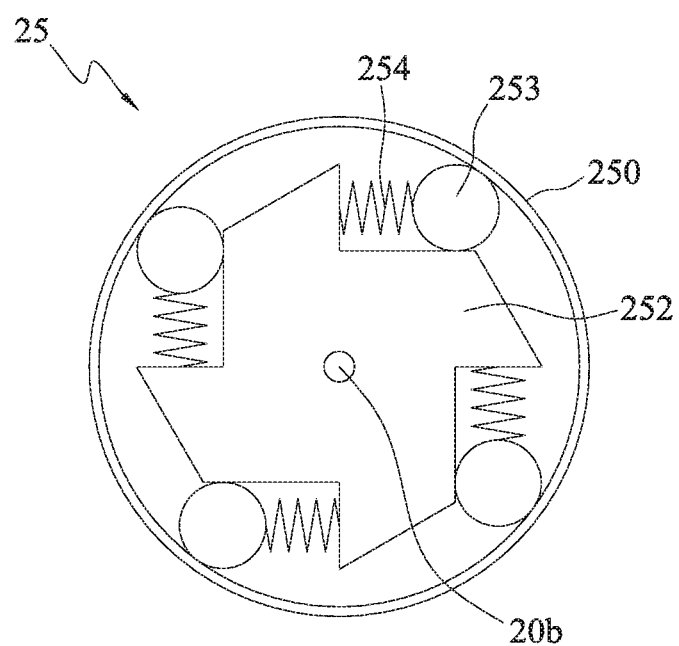
FIG. 4 is a planar rear view of FIG. 3.

As shown in FIGS. 3 and 4, the one-way component 25 includes a first one-way bearing 251 axially connected to the second shaft 20b, a second one-way bearing 252 axially connected to the second shaft 20b and coaxially with the first one-way bearing 251, and a centrifugal clutch 253 connected to the second one-way bearing 252 via a telescopic member 254 such as a spring. The first one-way bearing 251 and the second one-way bearing 252 move in different directions. The one-way component 25 further includes a passive member 250, which is an annular case connected onto the lower gear 221 of the second transmission 22 for receiving the centrifugal clutch 253. The centrifugal clutch 253 is of a roller structure.

Therefore, when the transmission mechanism 2 is in the first gear (e.g. the low-speed gear), the transmission of power P is shown by the direction of an arrow A. The first shaft 20a drives the first transmission 21, then the second shaft 20b operates in cooperation with the one-way component 25, and power P' is output via the lower gear 221 of the second transmission 22 and the output component 23. At this time, as the clutch 24 is not engaged with the second transmission 22, the upper gear 220 second transmission 22 does not operate.

In an embodiment, the first gear can generate two types of motions, that is, when the centrifugal clutch 253 is disengaged from the passive member 250 (as shown in FIG. 3), the transmission path passes through the second shaft 20b and the first one-way bearing 251 of the one-way component 25, such that the lower gear 221 of the second transmission 22 performs positive or forward motion (as shown by arrow A); on the contrary, when the centrifugal clutch 253 engages with the passive member 250 via the telescopic member 254 (as shown in FIG. 4), the transmission of power sequentially passes through the second shaft 20b, the second one-way bearing 252 of the one-way component 25, the centrifugal clutch 253 and the passive member 250, such that the lower gear 221 of the second transmission 22 performs negative or reverse motion (as shown by arrow A').

Furthermore, when the transmission mechanism 2 is used in the second gear (e.g., the high-speed gear), the clutch 24 will engage with the second transmission 22 (for example, when the clutch 24 moves towards and abuts against the upper gear 220 of the second transmission 22 along direction e), and the transmission of power P is shown by the direction of the arrow B. That is, the first shaft 20a drives the clutch 24, and then the second transmission 22 operates in cooperation with the first one-way bearing 251 of the one-way component 25, such that the lower gear 221 of the second transmission 22 outputs power P' via the output component 23. At this time, although the first shaft 20a would drive the first transmission 21 and the second shaft 20b, the rotational speed of the second transmission 22 (or its lower gear 221)

is higher than the rotational speed of the second shaft 20b (or the first transmission 21), resulting in idling of the second shaft 20b (or the first transmission 21), and the second transmission 22 will drive the output component 23 to output power P'.

In an embodiment, the transmission mechanism 2 will generate three reduction ratios r1, r2 and r3 (i.e., between the gears 210 and 211 of the first transmission 21; between the gears 220 and 221 of the second transmission 22; and between the lower gear 221 of the second transmission 22 and the output component 23).

In addition, the transmission mechanism 2 can be applicable to moving devices and types of cars that has no reversing function, such as, golf carts, cars, or the like, in order to drive, for example, wheels at different locations R and L of the differential 3.

In conclusion, the transmission mechanism according to the present disclosure provides two types of power output by using two drive structures in conjunction with a clutch and a one-way component.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A transmission mechanism, comprising:
   a first transmission comprising two gears;
   a second transmission comprising two gears;
   a first shaft connected to the gears of the first transmission and the second transmission;
   a second shaft connected to the gears of the first transmission and the second transmission;
   a clutch furnished corresponding to a location of the second transmission and furnished for controlling the first shaft; and
   a one-way component furnished corresponding to the location of the second transmission and to control actions of the first transmission or the second transmission, wherein
   the one-way component includes a first one-way bearing, a second one-way bearing coaxially connected to the first one-way bearing, and another clutch connected to the second one-way bearing, and
   the first one-way bearing and the second one-way bearing are furnished to move in different directions.

2. The transmission mechanism of claim 1, wherein the one-way component is a one-way bearing.

3. The transmission mechanism of claim 2, further comprising a casing furnished on the one-way component and connected to a shaft rod, wherein the shaft rod is connected externally to a gear engaged with a gear of a differential.

4. The transmission mechanism of claim 1, further comprising an output component driven by the second shaft and furnished for controlling in cooperation with the one-way component.

5. The transmission mechanism of claim 4, wherein, during a low-speed gear, the first shaft is furnished for driving the first transmission, the second shaft is furnished for operating in cooperation with the one-way component, and the output component is furnished for outputting power to complete power transmission.

6. The transmission mechanism of claim 4, wherein, during a high-speed gear, the clutch is furnished for engaging with the second transmission, the first shaft is furnished for driving the clutch, the second transmission is furnished for operating in cooperation with the one-way component, and the output component is furnished for outputting power to complete power transmission.

7. The transmission mechanism of claim 6, wherein during the high-speed gear, the clutch is furnished for moving towards one of the gears of the second transmission and abutting against the gear of the second transmission to engage with the second transmission.

8. The transmission mechanism of claim 4, wherein the output component is of a rod output type or a gear output type.

9. The transmission mechanism of claim 1, wherein the one-way component further includes a passive member furnished on an outer side of the another clutch.

10. The transmission mechanism of claim 9, wherein the passive member is an annular case furnished for receiving the another clutch therein.

11. The transmission mechanism of claim 9, wherein the another clutch is a centrifugal clutch and is connected to the second one-way bearing via a telescopic member.

12. The transmission mechanism of claim 11, wherein the second transmission includes a gear, and during a low-speed gear, the centrifugal clutch is furnished for disengaging from the passive member, with a transmission path of power passing through the second shaft and the first one-way bearing of the one-way component for the gear of the second transmission to perform positive or forward motion.

13. The transmission mechanism of claim 11, wherein the second transmission includes a gear, and during a reverse gear, the centrifugal clutch is furnished for disengaging from the passive member, with a transmission path of power sequentially passing through the second shaft, the second one-way bearing of the one-way component, the centrifugal clutch, and the passive member for the gear of the second transmission to perform negative or reverse motion.

14. The transmission mechanism of claim 11, wherein the second transmission includes a gear, and during a high-speed gear, the centrifugal clutch is furnished for disengaging from the passive member, and the clutch is furnished for engaging with the second drive structure, with a transmission path of power having the first shaft to drive the clutch, then the second transmission furnished for operating in cooperation with the first one-way bearing of the one-way component, and the gear of the second transmission outputting power via an output component.

15. The transmission mechanism of claim 1, wherein the first transmission includes a first gear driven by the first shaft and a second gear driven the second shaft.

16. The transmission mechanism of claim 1, wherein the second transmission includes a first gear driven by the first shaft and disposed corresponding to the clutch, and a second gear driven by the second shaft and disposed corresponding to the one-way component.

17. The transmission mechanism of claim 1, wherein the clutch is a centrifugal clutch.

* * * * *